US010851943B2

(12) United States Patent
Serrano et al.

(10) Patent No.: US 10,851,943 B2
(45) Date of Patent: Dec. 1, 2020

(54) METHOD FOR DETECTING AND EXTRACTING GASEOUS FLUID CONTAINED IN A CLOSED CIRCUIT FUNCTIONING ACCORDING TO A RANKINE CYCLE AND DEVICE USING SUCH A METHOD

(71) Applicants: IFP Energies nouvelles, Rueil-Malmaison (FR); ENOGIA, Marseilles (FR)

(72) Inventors: David Serrano, Lyons (FR); Jocelyn Terver, St Symphorien sur Coise (FR); Antonin Pauchet, Marseilles (FR); Arthur Leroux, Marseilles (FR)

(73) Assignees: IFP ENERGIES NOUVELLES, Rueil-Malmaison (FR); ENOGIA, Marseilles (FR)

( * ) Notice: Subject to any disclaimer, the term of this patent is extended or adjusted under 35 U.S.C. 154(b) by 70 days.

(21) Appl. No.: 16/311,322

(22) PCT Filed: Jun. 15, 2017

(86) PCT No.: PCT/EP2017/064718
§ 371 (c)(1),
(2) Date: Dec. 19, 2018

(87) PCT Pub. No.: WO2017/220434
PCT Pub. Date: Dec. 28, 2017

(65) Prior Publication Data
US 2019/0211968 A1  Jul. 11, 2019

(30) Foreign Application Priority Data

Jun. 20, 2016  (FR) .................................. 16 55689

(51) Int. Cl.
*F16T 1/12*  (2006.01)
*F01K 13/00*  (2006.01)
*F01K 23/06*  (2006.01)

(52) U.S. Cl.
CPC .............. *F16T 1/12* (2013.01); *F01K 13/003* (2013.01); *F01K 23/065* (2013.01)

(58) Field of Classification Search
CPC ......... F16T 1/12; F01K 23/065; F01K 13/003
See application file for complete search history.

(56) References Cited

U.S. PATENT DOCUMENTS

| | | | |
|---|---|---|---|
| 6,829,894 B2 * | 12/2004 | Bloch | F01K 13/00 60/646 |
| 2009/0151356 A1 * | 6/2009 | Ast | F01K 23/101 60/660 |

(Continued)

FOREIGN PATENT DOCUMENTS

| | | |
|---|---|---|
| FR | 2884555 A1 | 10/2006 |
| WO | 102010054963 A1 | 6/2012 |

OTHER PUBLICATIONS

International Search Report for PCT/EP2017/064718, dated Sep. 25, 2017; English translation submitted herewith (6 pgs.).

*Primary Examiner* — Shafiq Mian
(74) *Attorney, Agent, or Firm* — Fitch, Even, Tabin & Flannery, LLP

(57) ABSTRACT

A method and device for detecting and extracting a gaseous fluid contained in a closed loop operating on a Rankine cycle are provided. The loop includes a multiplicity of constituents with, successively, a circulation and compression pump for a working fluid, a heat exchanger associated with a hot source, an expansion machine, a cooling exchanger, a working fluid tank and circulation pipes connecting these constituents. The method and device measure the temperature (Tréelle) and the pressure (Préelle) of the working fluid at a (Continued)

point of the loop when this loop is at rest, and, as soon as the measured pressure (Préelle) exceeds a threshold value (Pliquide saturé) for a given ambient temperature (T), activate equipment for extracting the gaseous fluid in order to discharge it from the loop.

14 Claims, 1 Drawing Sheet

(56) References Cited

U.S. PATENT DOCUMENTS

| | | |
|---|---|---|
| 2010/0294377 A1 | 11/2010 | Aloni et al. |
| 2013/0104547 A1* | 5/2013 | Leduc .................. F01K 13/006 60/645 |
| 2014/0099184 A1 | 4/2014 | Asti et al. |
| 2015/0013338 A1* | 1/2015 | Smague .................. F01N 5/02 60/645 |
| 2015/0013935 A1 | 1/2015 | Ernst et al. |

* cited by examiner

METHOD FOR DETECTING AND EXTRACTING GASEOUS FLUID CONTAINED IN A CLOSED CIRCUIT FUNCTIONING ACCORDING TO A RANKINE CYCLE AND DEVICE USING SUCH A METHOD

CROSS-REFERENCE TO RELATED APPLICATIONS

This application is a U.S. national phase application filed under 35 U.S.C. § 371 of International Application No. PCT/EP2017/064718, filed Jun. 15, 2017, designating the United States, which claims priority from French Patent Application No. 16/55.689, filed Jun. 20, 2016, which are hereby incorporated herein by reference in their entirety.

FIELD OF THE INVENTION

The present invention relates to a method for detecting and extracting a gaseous fluid contained in a closed loop operating on a Rankine cycle and to a device using same.

As is widely known, a Rankine cycle is a thermodynamic cycle wherein heat coming from an external heat source is transmitted to a closed loop containing a working fluid.

This cycle is generally broken up into a stage where the low freezing point working fluid used is compressed in an isentropic manner, followed by a stage where this compressed fluid is heated and vaporized on contact with a heat source. This vapour is then expanded, in another stage, in an isentropic manner in an expansion machine, then, in a last stage, this expanded vapour is cooled and condensed on contact with a cold source.

To carry out these various stages, the loop comprises a pump for compressing the working fluid in liquid form and circulating it in the loop, a heat exchanger (or evaporator) that is swept by a hot fluid for at least partial vaporization of the compressed fluid, an expansion machine for expanding the vapour, such as a turbine that converts the energy of this vapour into another energy such as electrical energy, by coupling thereto an electric generator so as to form a turbogenerator, and another heat exchanger (or condenser) by means of which the heat contained in the vapour is yielded to a cold source, generally a cooling fluid or outside air that sweeps this condenser, so as to convert this vapour into a liquid.

BACKGROUND OF THE INVENTION

It is also well known, notably through document FR-2,884,555, to use the calorific energy conveyed by the exhaust gas of an internal-combustion engine, in particular the one used for motor vehicles, as the hot source providing heating and vaporization of the fluid flowing through the evaporator.

This allows to improve the energy efficiency of this engine by recovering a large part of the energy lost at the exhaust in order to convert it to an energy that can be used for the motor vehicle through the Rankine cycle loop.

As is well known, a fluid in gas form can be present in this loop, which involves the major drawback of decreasing the performances of the working fluid and of significantly degrading the overall efficiency of this Rankine cycle.

A fluid in gas form is understood to be a fluid different from the working fluid, which can be air or any other gaseous fluid resulting from the decomposition or the degradation of the working fluid.

For simplification reasons, in the rest of the description below, the gaseous fluid considered is air.

This air may result from an imperfect purge of the loop upon filing thereof with working fluid, or from the working fluid that can desorb the air it contains during operation of the loop, or from air leaking into the loop, notably at the junctions between the various elements of the loop, in particular when the loop is shut off.

It is well known, notably through document US-2014/0,099,184, to detect the presence of air in the closed loop, then to send this air to the expansion machine where it is confined.

Such an operation involves the major drawback of complicating the closed loop for guiding the air towards the expansion machine.

The present invention aims to overcome the aforementioned drawbacks by providing a simple and inexpensive method and device for operating at all times a Rankine cycle closed loop devoid of air.

SUMMARY OF THE INVENTION

The invention thus relates to a method for detecting and extracting a gaseous fluid contained in a closed loop operating on a Rankine cycle, said loop comprising a multiplicity of constituents with, successively, a circulation and compression pump for a working fluid, a heat exchanger associated with a hot source, an expansion machine, a cooling exchanger, a working fluid tank and circulation pipes connecting these constituents, characterized in that it comprises:
  measuring the temperature and the pressure of the working fluid at a point of the loop when this loop is at rest, and
  as soon as the measured pressure exceeds a threshold value for a given ambient temperature, activating an equipment for extracting the gaseous fluid in order to discharge it from the loop.

The loop can be at rest when no working fluid circulation occurs at the extraction equipment and the measured temperature substantially corresponds to the ambient temperature.

The temperature and the pressure of the working fluid can be measured at a low elevation point of the loop.

The gaseous fluid extraction equipment arranged at a high point of the loop can be activated.

The extraction equipment can be activated by actuating a gaseous fluid extraction pump and by controlling the opening of a valve controlling the circulation of the gaseous fluid in a pipe connecting the pump to the loop.

A gaseous fluid comprising either air or any other gaseous fluid resulting from the decomposition or the degradation of the working fluid used in said Rankine cycle loop can be extracted.

The extracted gaseous fluid can be sent out of the loop.

The invention also relates to a device for detecting and extracting a gaseous fluid contained in a closed loop operating on a Rankine cycle, said loop comprising a compression/circulation pump for a working fluid in liquid form, a heat exchanger swept by a hot source for evaporation of said fluid, means for expanding the fluid to vapour form, a cooling exchanger swept by a cold source for condensation of the working fluid, a working fluid tank and working fluid circulation pipes, characterized in that the device comprises at least one pressure sensor and at least one temperature sensor associated with a calculation table for detecting the presence of a gaseous fluid in the closed loop at rest, and an equipment for extracting the gaseous fluid from the loop.

The calculation table can comprise al or part of a Mollier diagram.

The gaseous fluid extraction equipment can comprise a gaseous fluid extraction pump connected to the loop.

The equipment can comprise a gaseous fluid pipe connecting the loop to the gaseous fluid extraction pump.

The equipment can comprise a controlled valve allowing the gaseous fluid circulation in the gaseous fluid pipe to be controlled.

The equipment can comprise a pipe for discharging the gaseous fluid to the outside.

The gaseous fluid can comprise either air or any other gaseous fluid resulting from the decomposition or the degradation of the working fluid used in said Rankine cycle loop.

BRIEF DESCRIPTION OF THE FIGURES

Other features and advantages of the invention will be clear from reading the description hereafter, given by way of non limitative example, with reference to the accompanying figures wherein.

DETAILED DESCRIPTION OF THE INVENTION

Figure 1:
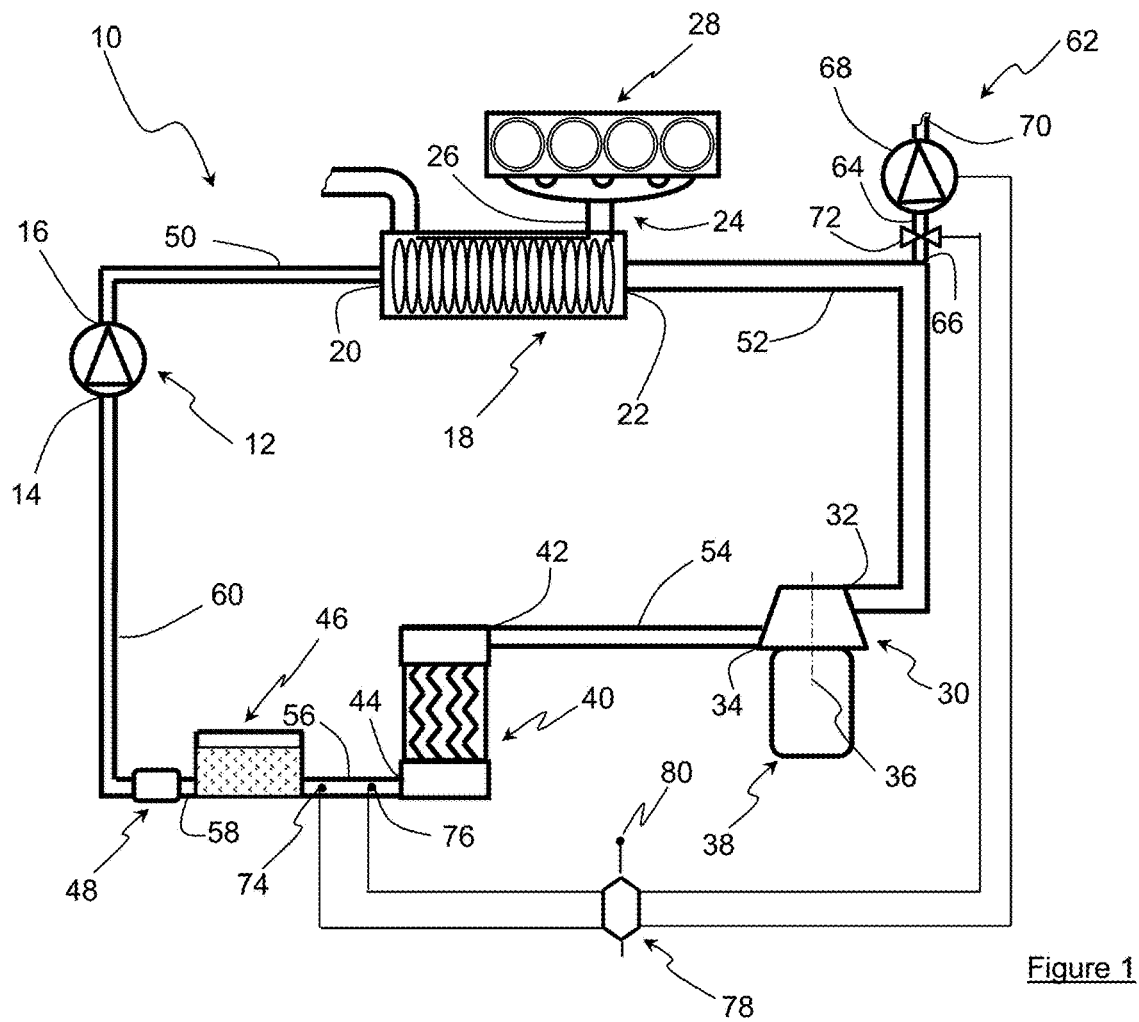
FIG. 1 illustrates a closed loop operating on a Rankine cycle with the method and the device according to the invention.

FIG. 1 illustrates a Rankine cycle closed loop 10 which is advantageously of ORC (Organic Rankine Cycle) type and uses an organic fluid or mixtures of organic fluids such as butane, ethanol, hydrofluorocarbons, carbon dioxide, etc.

It is understood that the closed loop can operate with a non-organic fluid such as ammonia or water.

This loop comprises a circulation and compression pump 12 for the working fluid, referred to as circulation pump in the description below, with an inlet 14 for the working fluid in liquid form and an outlet 16 for the working fluid also in liquid form, but compressed under high pressure. This pump is advantageously rotated by any means such as an electric motor (not shown).

This loop also comprises a heat exchanger 18, referred to as evaporator, traversed by the compressed working fluid between an inlet 20 for this liquid fluid and an outlet 22 through which the working fluid leaves the evaporator in compressed vapour form. This evaporator is traversed by a hot source 24 in liquid or gaseous form.

This hot source can come from the exhaust gas circulating in exhaust line 26 of an internal-combustion engine 28, from the coolant of an internal-combustion engine, the coolant of an industrial furnace or from the heat carrier fluid heated in thermal plants or by a burner.

The loop also comprises an expansion machine 30 receiving, through inlet 32, the working fluid in form of vapour compressed to a high pressure level, this fluid leaving this machine through outlet 34 in form of vapour expanded to a low pressure level.

Advantageously, this expansion machine is in form of an expansion turbine whose rotor shaft is rotated by the working fluid in vapour form by driving a connecting shaft 36 (illustrated in dotted line) into rotation. Preferably, this shaft allows the recovered energy from the working fluid to be transmitted to any converting device such as, for example, an electric generator 38.

The loop further comprises a cooing exchanger 40, or condenser, with an inlet 42 for the expanded low-pressure vapour and an outlet 44 for the low-pressure working fluid converted to liquid form after passing through this condenser. The condenser is swept by a cold source, generally a cold water stream usually at ambient temperature, in order to cool the expanded vapour so that it condenses and converts to a liquid. Of course, any other cold cooling source such as another coolant or cold air can be used to ensure condensation of the vapour.

This loop also comprises, between the condenser and the circulation pump, a closed tank 46 allowing to maintain the working fluid in the liquid state, and preferably a filter 48 such as a cartridge filter for filtering the working fluid leaving the tank prior to feeding it into the pump.

The various elements of the loop are connected to each other by fluid circulation pipes 50, 52, 54, 56, 58, 60 allowing to successively connect the pump to the evaporator (evaporator pipe 50), the evaporator to the turbine (turbine pipe 52), the turbine to the condenser (condenser pipe 54), the condenser to the tank (tank pipe 56), the tank to the filter (filter pipe 58) and the filter to the pump (pump pipe 60), so that the working fluid circulates clockwise.

As shown in FIG. 1, the loop further comprises a gaseous fluid extraction equipment 62, the fluid being air here, which is arranged at the highest point of the loop, i.e. a point in the loop where air accumulates.

This extraction equipment comprises an air pipe 64 starting at a connection 66 with the highest point of the loop, here one of the highest pipes in the loop as shown in FIG. 1, such as pipe 52. This air pipe leads to an air extraction means, here a pump 68 referred to as air extraction pump, carrying a discharge pipe 70 for sending the extracted air to the outside of the loop or to a buffer tank (not shown). The air pipe carries a valve 72, advantageously a controlled valve, between the air pump and the connection allowing the air circulation in the air pipe to be controlled.

The loop advantageously comprises a pressure sensor 74 and a temperature sensor 76, preferably arranged at the lowest point of the loop, i.e. on one of the pipes at the lowest elevation point, considering the loop as shown in FIG. 1. These sensors are preferably located in the low pressure zone of the loop between the turbine outlet and the circulation pump inlet.

Advantageously, by way of example, these sensors are arranged on pipe 56 at the outlet of condenser 40. Pressure sensor 74 thus allows to know the pressure prevailing in the part of the loop that is under low pressure while the temperature sensor allows to know the temperature of the working fluid leaving the condenser, which is basically the lowest temperature of the fluid circulating in the loop.

Of course, a control unit 78 of calculator type for example is provided; it drives the various actuators of the loop, such as the valve or the air pump, and it receives the measurements from the various sensors, such as pressure sensor 74 and temperature sensor 76.

This calculator also contains calculation tables, with notably the saturated liquid curve equation $P_{liquide\ saturé} = f(T)$ allowing to know the theoretical value of the liquid pressure $P_{liquide\ saturé}$ as a function of the measured temperature $T_{réelle}$.

More particularly, this curve is derived from the Mollier diagram (see FIG. 2) that takes into account the pressure (P in bar) of the working fluid against the specific enthalpy (in kJ/kg) of this fluid.

Advantageously, this curve can correspond to a part of the Mollier diagram. Indeed, knowledge of the saturated liquid pressure curve against the temperature is sufficient.

The assembly thus made up of the air extraction equipment, the sensors and the calculator forms a detection and extraction device for a gaseous fluid used in a closed loop.

The method applied to this loop consists in detecting the presence of a gaseous fluid, air here, in the loop at rest and in extracting this air from this loop.

To detect the presence of air, the method consists in measuring the thermodynamic pressure $P_{réelle}$ and temperature $T_{réelle}$ conditions of the fluid by means of the pressure sensor and of the temperature sensor in the loop when it is at rest and the working fluid is cold, before restarting the loop for example.

The closed loop is considered to be at rest when no working fluid circulation occurs at extraction equipment 62 and when the working fluid is cold, i.e. temperature $T_{réelle}$ of the fluid is at ambient temperature T or close thereto (within ±5° C.).

Once these conditions reached, the two values $P_{réelle}$ and $P_{liquide\ saturé}$ are compared from the Mollier diagram as a function of ambient temperature T.

Figure 2:
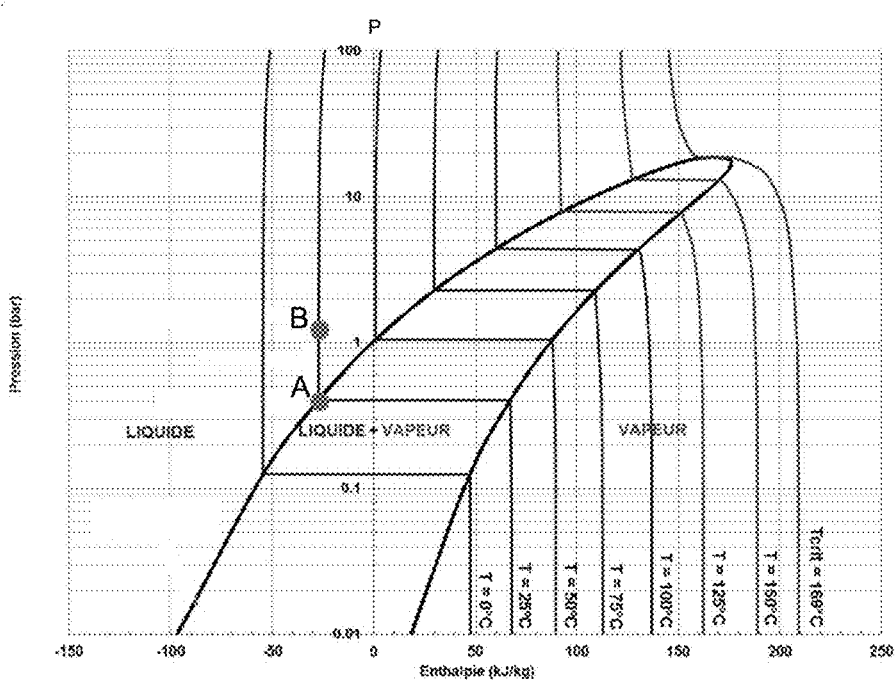
FIG. 2 shows a Mollier diagram plotting the pressure versus the specific enthalpy, which is used for the method according to the invention.

Thus, by way of example, for an ambient temperature T of 25° C.:
- if $P_{réelle}$ is equal to threshold value $P_{liquide\ saturé}$ or close to this pressure (within ±3%) (point A), no air is present in the loop and no other operation is required;
- if $P_{réelle}$ is greater than threshold value $P_{liquide\ saturé}$ (point B), as indicated in FIG. 2, the loop contains air that has accumulated in the upper part thereof, this low-density air is naturally localized in the volumes of maximum elevation, pipe 52 here, and corrective action is required.

The corrective action consists in extracting the air contained in the loop by making extraction equipment 62 arranged at a high point of the loop operational.

Air extraction pump 68 is then activated and opening of valve 72 is controlled so as to allow free circulation of the air between connection 66 to loop 10 and pump 68.

The extracted air is then discharged to the atmosphere or to a storage volume through pipe 70.

Of course, it is within the reach of the person skilled in the art to parameterize the activation time of the air extraction pump and the opening time of the valve in order to obtain complete extraction of the air, notably as a function of the evolution of the difference $P_{réelle}-P_{liquide\ saturé}$.

At the end of this corrective action, a loop containing a working fluid freed from gases such as air is obtained.

The loop can then be made operational while providing all the required performances.

The invention claimed is:

1. A method for detecting and extracting a gaseous fluid contained in a closed loop operating on a Rankine cycle, the closed loop comprising a multiplicity of constituents successively positioned, which includes a circulation and compression pump for a working fluid, a heat exchanger associated with a hot source, an expansion machine, a cooling exchanger, a working fluid tank and circulation pipes connecting the multiplicity of constituents, the method comprising:
measuring a temperature and a pressure of the working fluid at a point of the closed loop when the closed loop is at rest, wherein the closed loop is at rest when no working fluid circulation occurs at extraction equipment, and
as the measured pressure exceeds a threshold value for a given ambient temperature (T), activating the extraction equipment for extracting the gaseous fluid in order to discharge the gaseous fluid from the closed loop.

2. A method as claimed in claim 1, wherein the closed loop is at rest when the measured temperature substantially corresponds to the ambient temperature.

3. A method as claimed in claim 1, wherein the temperature and the pressure of the working fluid are measured at a low elevation point of the closed loop.

4. A method as claimed in claim 1, wherein the gaseous fluid extraction equipment is arranged at a high elevation point of the closed loop.

5. A method as claimed in claim 4, wherein the extraction equipment is activated by actuating a gaseous fluid extraction pump and by controlling an opening of a valve controlling the circulation of the gaseous fluid in a pipe connecting the gaseous fluid extraction pump to the closed loop.

6. A method as claimed in claim 1, wherein the gaseous fluid extracted from the working fluid comprises either air or any other gaseous fluid resulting from decomposition or degradation of the working fluid in the Rankine cycle loop.

7. A method as claimed in claim 1, wherein the extracted gaseous fluid is sent out of the closed loop.

8. A device for detecting and extracting a gaseous fluid contained in a closed loop operating on a Rankine cycle, the closed loop comprising:
a compression/circulation pump for a working fluid in liquid form,
a heat exchanger swept by a hot source for evaporation of the working fluid,
means for expanding the working fluid in vapor form,
a cooling exchanger swept by a cold source for condensation of the working fluid,
a working fluid tank and working fluid circulation pipes,
wherein the device comprises:
at least one pressure sensor and at least one temperature sensor for measuring a temperature and a pressure of the working fluid at a point of the closed loop when the closed loop is at rest, wherein the closed loop is at rest when no working fluid circulation occurs at gaseous fluid extraction equipment,
gaseous fluid extraction equipment for extracting the gaseous fluid from the closed loop, and
a control unit for receiving a pressure measurement from the at least one pressure sensor and a temperature measurement from the at least one temperature sensor and, as the measured pressure exceeds a threshold value for a given ambient temperature (T), activating the gaseous fluid extraction equipment for extracting the gaseous fluid in order to discharge the gaseous fluid from the closed loop.

9. A device as claimed in claim 8, wherein the control unit detects the presence of the gaseous fluid to be extracted by comparing the pressure measurement received from the at least one pressure sensor and the temperature measurement received from the at least one temperature sensor to all or part of a Mollier diagram.

10. A device as claimed in claim 8, wherein the gaseous fluid extraction equipment comprises a gaseous fluid extraction pump connected to closed loop.

11. A device as claimed in claim 10, wherein the gaseous fluid extraction equipment comprises a gaseous fluid pipe connecting the closed loop to the gaseous fluid extraction pump.

12. A device as claimed in claim 11, wherein the gaseous fluid extraction equipment comprises a controlled valve allowing the gaseous fluid circulation in the gaseous fluid pipe to be controlled.

13. A device as claimed in claim 8, wherein the gaseous fluid extraction equipment comprises a pipe for discharging the gaseous fluid to outside.

14. A device as claimed in claim 8, wherein the gaseous fluid comprises either air or any other gaseous fluid resulting from decomposition or degradation of the working fluid used in the Rankine cycle loop.

\* \* \* \* \*